United States Patent [19]
Malinowski et al.

[11] Patent Number: 5,484,091
[45] Date of Patent: Jan. 16, 1996

[54] VEHICLE CARGO ORGANIZER

[75] Inventors: Leo Malinowski, Detroit; Terrance R. Evans, Clarkston, both of Mich.

[73] Assignee: MascoTech Automotive Systems Group, Inc., Auburn Hills, Mich.

[21] Appl. No.: 134,350

[22] Filed: Jan. 12, 1994

[51] Int. Cl.$^6$ ........................................... B60R 9/00
[52] U.S. Cl. ................... 224/542; 224/42.34; 224/42.33; 224/925
[58] Field of Search ............................ 224/42.42, 42.34, 224/42.33, 273, 282; 211/195, 85, 12; 296/37.5; 410/94, 121, 135, 248

[56] References Cited

U.S. PATENT DOCUMENTS

| | | | |
|---|---|---|---|
| 1,378,610 | 5/1921 | Perkins | 224/42.34 |
| 1,659,821 | 2/1928 | Hutton | 224/42.34 |
| 3,195,745 | 7/1965 | Cretsinger . | |
| 4,062,170 | 12/1977 | Orem . | |
| 4,540,213 | 9/1985 | Herlitz et al. | 224/42.42 |
| 4,684,087 | 8/1987 | Spickard . | |
| 4,718,584 | 1/1988 | Schoeny | 224/42.42 |
| 4,884,733 | 12/1989 | Geeves . | |
| 4,974,799 | 12/1990 | Palmer . | |
| 5,054,688 | 10/1991 | Ricchuiti . | |
| 5,094,375 | 3/1992 | Wright . | |
| 5,129,612 | 7/1992 | Beaupre | 224/42.42 |
| 5,131,499 | 7/1992 | Hoar . | |
| 5,161,700 | 11/1992 | Stannis et al. . | |

FOREIGN PATENT DOCUMENTS

| | | | |
|---|---|---|---|
| 2249531 | 5/1992 | United Kingdom | 224/42.45 R |
| 8808379 | 11/1988 | WIPO | 224/273 |

*Primary Examiner*—Henry J. Recla
*Assistant Examiner*—David J. Walczak
*Attorney, Agent, or Firm*—Edgar A. Zarins; Malcolm L. Sutherland

[57] ABSTRACT

A package or cargo organizer for the cargo area of a vehicle. The organizer is typically maintained in a lowered position providing a flat surface in the cargo area. The folded down organizer provides a durable surface and an aesthetically appealing cargo area. The organizer can be selectively folded up with one hand creating divided sections for maintaining cargo items from falling down. The organizer includes a frame and a foldable interior section which operates as a stand for the frame. Clips formed in the frame can be utilized to retain shopping bag handles to prevent spillage. The organizer may be used in the trunk cargo floor of the vehicle or as part of a rollout load floor for utility vehicles.

18 Claims, 4 Drawing Sheets

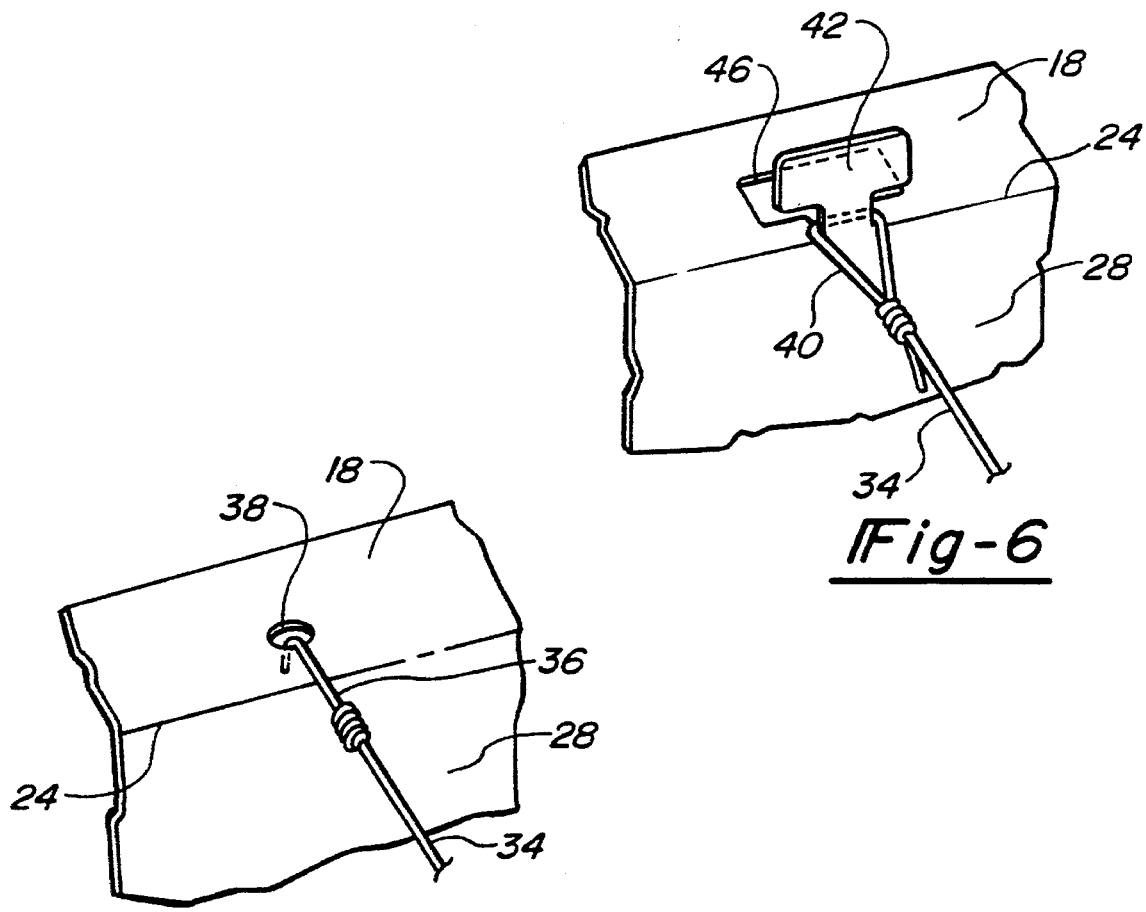
Fig-6
Fig-5
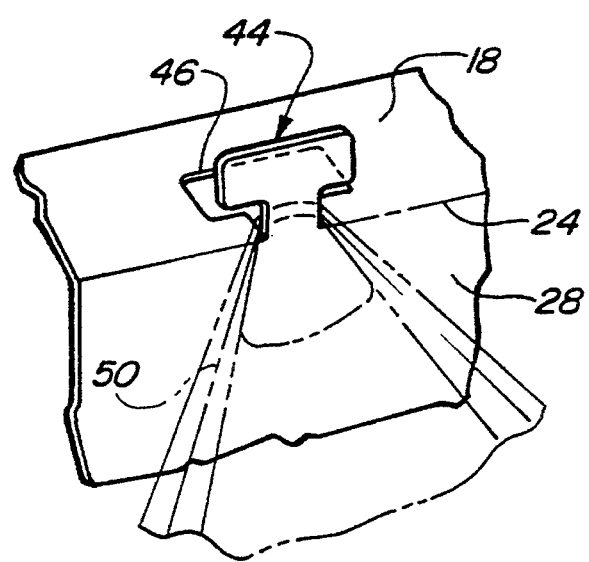
Fig-7

VEHICLE CARGO ORGANIZER

BACKGROUND OF THE INVENTION

I. Field of the Invention

This invention relates to a cargo organizer for a vehicle and, in particular, to an organizer which is stored in a flat position forming a load floor and which can be readily folded upwardly to create divided cargo sections within a cargo area of the vehicle to prevent spillage.

II. Description of the Prior Art

The organization or maintenance of cargo within a cargo area of a motor vehicle has become an increasingly important feature for vehicle owners. This is particularly true with the increased popularity of utility vehicles which include large flat areas of cargo storage. In vehicles with trunks the tendency for cargo to move around is lessened although cargo retainers can be desirable.

Early cargo organizers or retainers included cargo nets which could be stretched from one side of the cargo area to the other to create a patent for the cargo. Typically, the net utilizes a wall of the cargo area to positionally capture the cargo. Although useful for packages of limited sizes, the cargo nets cannot retain large packages particularly items having a rectangular configuration. Moreover, the resilient nature of the cargo net allows the cargo some movement which can cause damage or spillage.

More rigid organizers have been employed which compartmentalize the cargo area. Such assemblies typically depend upon rigid walls. In order to increase the storage area or during non-use, these rigid walls may fold downwardly to the floor of the cargo area or outwardly to the side walls. In either case, the folded organizer takes up considerable space which may be needed in certain circumstances. In such situations, the organizer may need to be removed causing the user the problem of storage of the organizer. Additionally, because of the various layers created by the folded organizer a truly flat load surface may not be possible.

Still other organizers are exceedingly complicated and therefore expensive. Although consumers view such organizers as a useful feature, they are not willing to pay more than a nominal amount for such conveniences. Thus, such organizers must be cost effective, simple and compact for any practical application in modern motor vehicles.

SUMMARY OF THE PRESENT INVENTION

The present invention overcomes the disadvantages of the prior known cargo organizers by providing a simple organizer which can be stored in a flat position maximizing cargo area yet easily folds upwardly to compartmentalize the cargo area. The cargo organizer of the present invention is adapted to be easily removed for cleaning yet does not intrude within the cargo space while collapsed flat against the cargo floor.

The cargo organizer of the present invention forms a flat load surface when in the lowered position. The organizer includes a frame which defines the cargo area and folding inner panel hingedly connected to the frame for selectively maintaining the frame in a raised position. Dividers are provided compartmentalizing the organizer. In a preferred embodiment, the inner panel is cut-out of the frame along three edges thereby forming a living hinge along the remaining edge. The inner panel is longitudinally scored forming a living hinge along the panel such that the frame can be propped up by the inner panel. The inner panel folds to form a back wall for the organizer. A forward edge of the frame is hingedly connected directly to the load floor such that upon set up the frame is disposed at an angle extending from the load floor to the top of the supporting inner panel.

In an alternative embodiment, the load floor incorporates a living hinge allowing a portion to be folded upwardly to form the vertical wall of the organizer. A plurality of dividers can be folded outwardly to not only compartmentalize the organizer but also to prop up the hinged wall.

The vehicle cargo organizer includes additional features to facilitate retention of packages. A hook is cut out of the planar organizer such that upon set up means are provided for hooking the handles of plastic grocery bags or the like, Because of the cut out form of the back support and the hanger hooks, upon folding down the organizer a flat load surface is created.

Other objects, features and advantages of the invention will be apparent from the following detailed description taken in connection with the accompanying drawings.

BRIEF DESCRIPTION OF THE DRAWING

The present invention will be more fully understood by reference to the following detailed description of a preferred embodiment of the present invention when read in conjunction with the accompanying drawing in which like reference characters refer to like parts throughout the view and in which:

FIG. 5 is an enlarged view of the retainer hookup shown in circle 5 of FIG. 2;

FIG. 6 is an alternative embodiment of the retainer hook-up; and

FIG. 7 is an enlarged view of the package hook in circle 7 of FIG. 2;

DETAILED DESCRIPTION OF A PREFERRED EMBODIMENT OF THE PRESENT INVENTION

Figure 1:
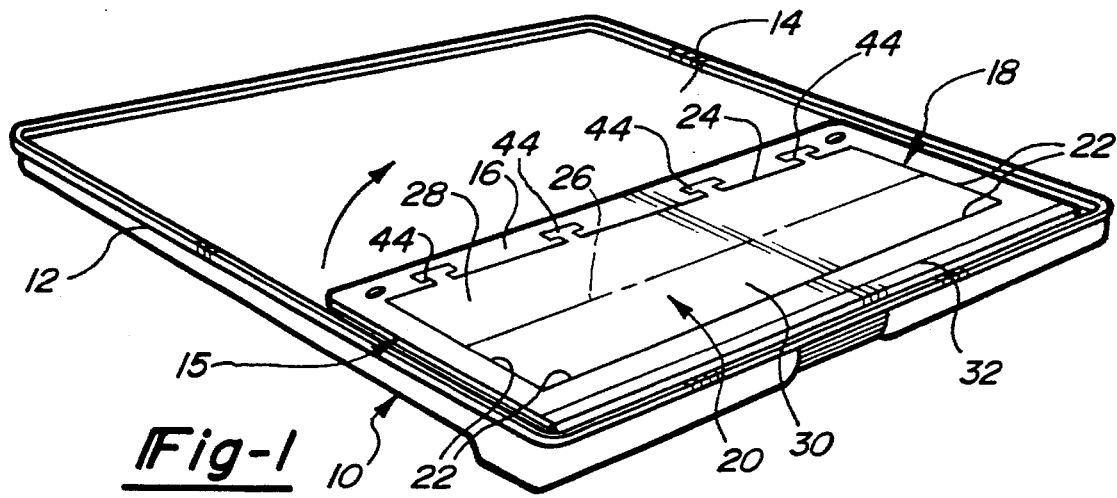
FIG. 1 is a perspective view of a cargo organizer for a vehicle embodying the present invention, the organizer stored in the collapsed position.
Figure 2:
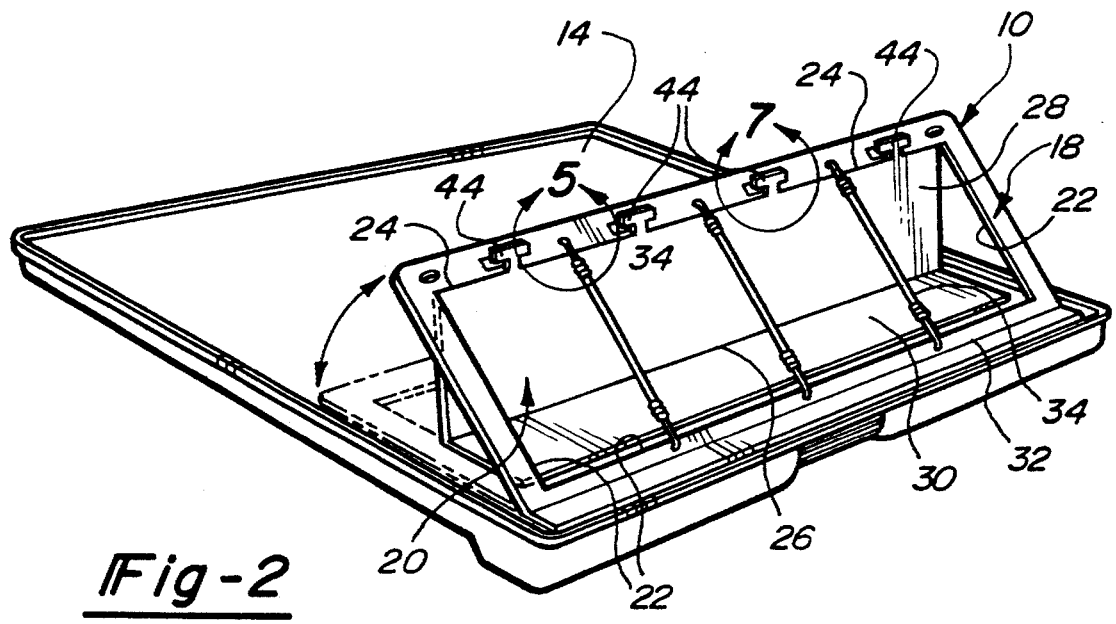
FIG. 2 is a perspective view of the cargo organizer in the raised position.

Referring first to FIGS. 1 and 2, there is shown a preferred embodiment of a cargo organizer 10 suitable for the cargo storage area of a vehicle. The organizer 10 can be used as a stand alone option in a trunk of a passenger vehicle or the rear cargo area of a utility vehicle or may be provided as part of a movable load floor 12 reciprocatingly mounted within the rear cargo area of a utility vehicle. During non-use, the organizer 10 is designed to lay flat as shown in FIG. 1 forming a planar load surface 14 for the vehicle. The organizer 10 can be quickly moved with a single hand to a raised position (FIG. 2) for retaining packages as will be subsequently described.

The preferred form of the organizer 10 comprises a single sheet of material, such as a plastic material, which is durable against wear yet can be integrally maintained through living or mechanical hinges to allow folding of the material. In the stored position (FIG. 1), the organizer forms a durable load floor 14 on which cargo can be placed. Upon folding up the organizer 10 (FIG. 2), a compartmentalized organizer is formed to prevent sliding and tipping of individual packages such as grocery bags. The organizer 10 includes an integral sheet 15 having a peripheral frame 18 and an inner panel 20 at least partially cut out of the frame 18. The inner panel 20 is detached from the frame 18 along three of its edges 22 to allow separation from the frame 18 yet remains connected to the frame 18 along the remaining edge 24 forming a living hinge between the frame 18 and the inner panel 20. The hinged connection can be formed by scoring or partially cutting through the sheet material or otherwise creating a hinged connection.

A longitudinal hinge 26 is also formed in the panel 20 allowing folding of the panel 20 along a center line. The hinge 26 is also formed by scoring or partially cutting the sheet material to maintain the integrity of the organizer 10. The folding inner panel 20 acts as a leg to prop up the frame 18 as best shown in FIG. 2 forming the organizer 10. Upon erection of the organizer 10, the inner panel 20 folds forming an upright wall 28 and a base wall 30 retaining the frame 18 at an angle extending from the top of the upright wall 28 to the load floor 14. Preferably, the frame 18 is hingedly connected along edge 32 to the load floor 14 or other structure of the vehicle.

Whereas the erected frame 18 and the upright wall 28 of the inner body partially compartmentalize the organizer 10 to retain cargo, additional dividers may be provided to divide the organizer into smaller compartments. The organizer 10 of FIG. 2 is provided with simple cord dividers 34 extending between the upper and lower edges of the frame 18. In a preferred embodiment, the dividers 34 are bungee cords. Referring to FIGS. 5 and 6, the divider cords 34 detachably connected to the frame 18 to permit variations in the size of the individual compartments of the organizer 10. In the embodiment of FIG. 5, the divider cord 34 is provided with a hook 36 which can be detachably connected to an aperture 38 in the frame 18. In the embodiment of FIG. 6, the divider cord 34 includes looped ends 40 which can be detachably connected to a tab 42 formed in the organizer 10. Preferably, the tab 42 is an extension of the upright wall 28 of the inner panel 20. Accordingly, any number of detachable dividers 34 may be incorporated into the organizer 10 to compartmentalize the organizer 10.

The organizer 10 also includes means for retaining packages such as plastic grocery bags. As shown in FIG. 7, formed in the upright wall 28 are a plurality of tabs 44. The tabs 44 are cut out of the sheet material forming an opening 46 corresponding to the shape of the tab 44 such that upon erection of the organizer 10 the tabs 44 extend upwardly above the frame 18. This is accomplished by forming the tabs 44 as an extension of the upright wall 28 and not extending the hinged connection 24 through the tabs 44. Upon collapse of the organizer, the tabs 44 will lie flat within the opening 46. Preferably, the tabs 44 are T-shaped allowing the handle 50 of the grocery bag to be hooked over the tabs 44. As a result, the flexible bags will be prevented from spilling their contents.

Figure 3:
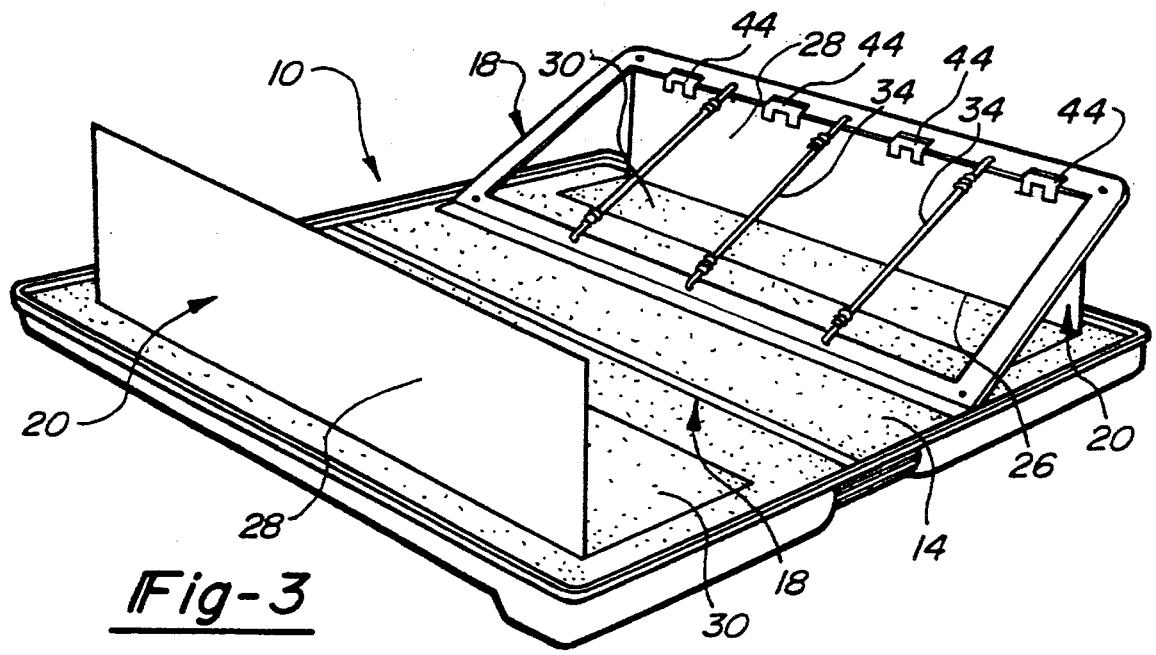
FIG. 3 is a perspective view of an alternative arrangement of the cargo organizer.

FIG. 3 illustrates an alternative embodiment wherein a pair of organizers 10 are positioned in facing relationship on the load floor 14.

Figure 4:
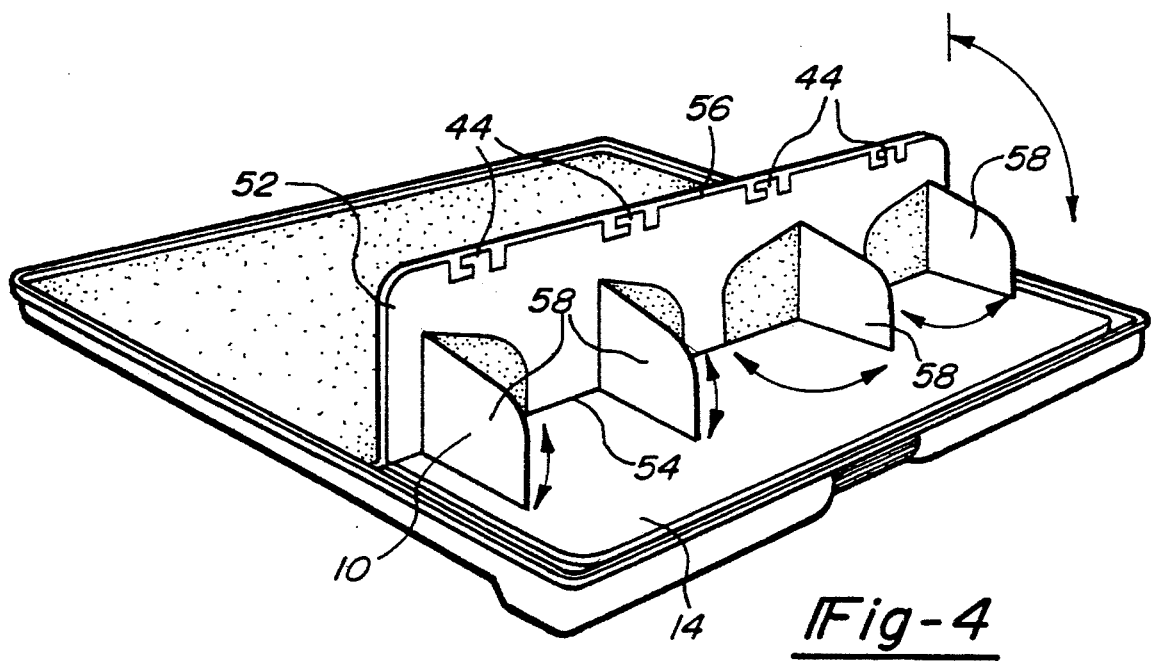
FIG. 4 is a perspective view of an alternative embodiment of the cargo organizer.

FIG. 4 shows a still further embodiment of the organizer 10 which can be readily folded down to form a flat load floor.

This embodiment of the organizer 10 includes a single panel 52 hingedly connected to the load floor 14 along a longitudinal edge 54. Cargo tabs 44 are formed along the upper edge 56 of the panel 52. In order to maintain the panel 52 upright, a plurality of pivotable dividers 58 are provided. The dividers are hingedly connected to the upright panel 52 maintaining the integral nature of the organizer 10. The dividers 58 form a right angle between the panel 52 and the load floor 14. The dividers 58 may be selectively used to vary the number and size of the compartments in the organizer 10. To collapse the organizer 10, the dividers 58 are simply folded against the panel 52 and the panel 52 is folded downwardly forming a planar load floor 14.

Figure 8:
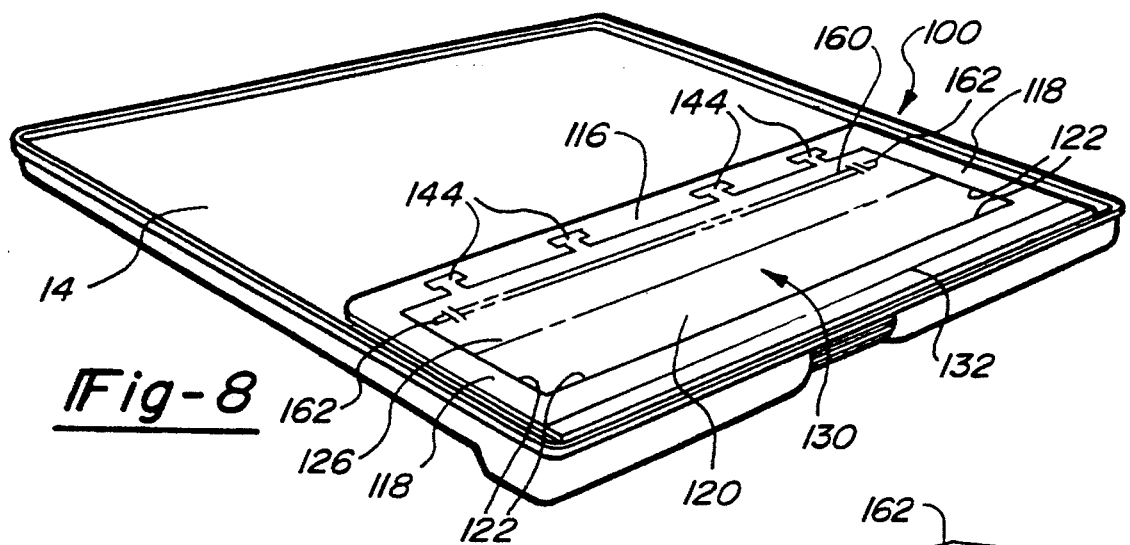
FIG. 8 is a perspective view of a still further embodiment of the cargo organizer folded down against the load floor.
Figure 9:
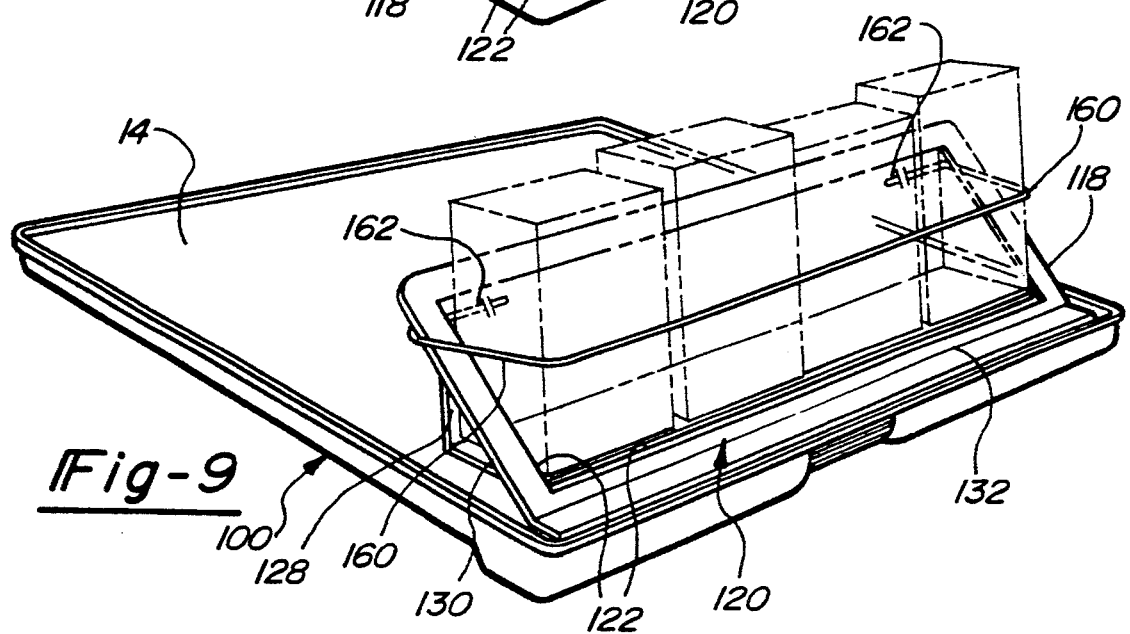
FIG. 9 is a perspective view of the cargo organizer in the raised position with cargo stored therein.
Figure 10:
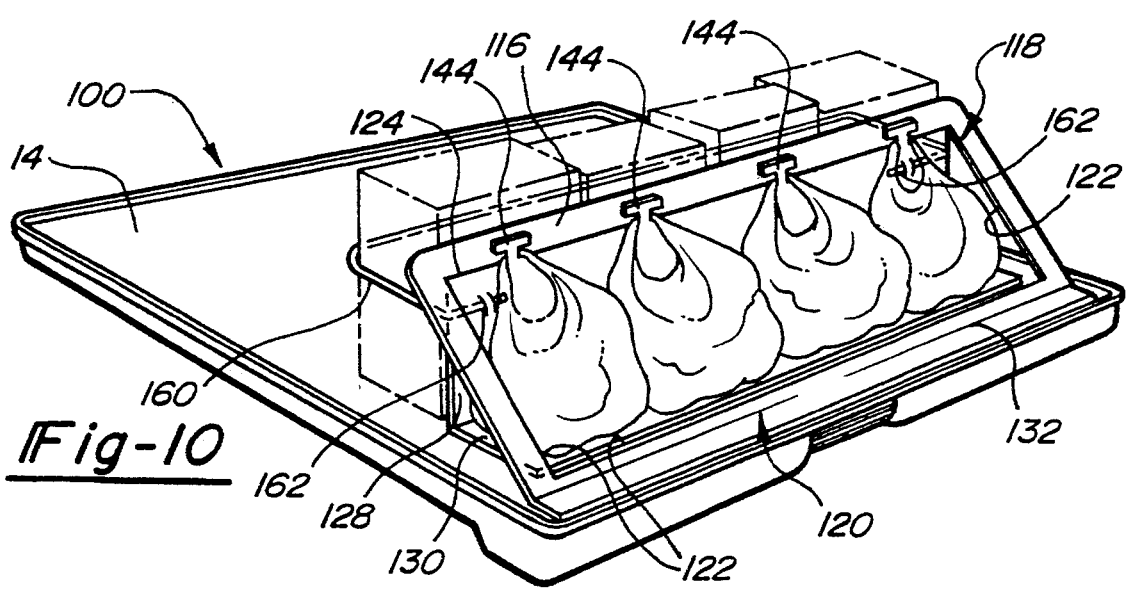
FIG. 10 is a perspective view of the cargo organizer retaining cargo within and proximate to the organizer.

Another embodiment of the organizer 100 is shown in FIGS. 8 through 10. The organizer 100 includes the same single panel construction hingedly connected to the load floor along a longitudinal edge 154 cargo tabs 144 are formed along the upper edge 156 of the panel 152. Instead of the compartmentalizing dividers, the organizer 100 has a single compartment with frame 118. A single bungee cord 160 extends longitudinally along the organizer 100 and is preferably connected at its ends 162 to the upright wall 128. In the collapsed position, the bungee 160 lies flat (FIG. 8). The bungee 160 can be wrapped around cargo stored within the frame 118 (FIG. 9) or behind the upright wall 128 (FIG. 10). The latter configuration increases the storage capacity of the organizer.

Thus, the present invention provides a convenient means of organizing cargo within a vehicle. The organizer 10 can be quickly erected to create a compartmentalized cargo area to accommodate various sized packages. In addition, the organizer 10 can be collapsed creating a planar load floor for larger cargo or simply for appearances. The integral construction reduces manufacturing costs and creates the planar load floor upon collapse.

The foregoing detailed description has been given for clearness of understanding only and no unnecessary limitations should be understood therefrom as some modifications will be obvious to those skilled in the art without departing from the scope and spirit of the appended claims.

What is claimed is:

1. A cargo organizer for a rear cargo compartment of a vehicle, said cargo compartment having a load floor, said vehicle cargo organizer comprising:

a substantially planar body adapted to be hingedly mounted to the load floor of the cargo compartment, said body selectively foldable to form a compartmentalized organizer, said organizer stored substantially flush with the load floor and substantially covering the load floor within a periphery of said planar body thereby forming a flat load surface within the cargo compartment, said planar body including an upper wall and a base wall hingedly connected along a fold line, said body folding along said hinged line upon erection of said organizer such that said upper wall forms a substantially vertical support and said base wall remains flush with said load floor.

2. The cargo organizer as defined in claim 1 and further comprising means for dividing said organizer into a plurality of separated compartments, said dividing means selectively engageable to vary the size and number of compartments in said organizer.

3. The cargo organizer as defined in claim 2 wherein said planar body includes a peripheral frame hingedly mounted to the load floor and an inner panel hingedly connected to said frame along one common edge, said panel disposed within said frame upon storing said organizer flat within said cargo compartment.

4. The cargo organizer as defined in claim 3 wherein said inner panel is connected to said frame by a living hinge extending along said common edge thereby maintaining said inner panel integral with said frame.

5. The cargo organizer as defined in claim 3 wherein said inner panel selectively forms a support leg for said frame upon erection of said organizer, said frame extending at an angle from said hinged edge of said inner panel spaced above the load floor downwardly to the load floor.

6. The cargo organizer as defined in claim 5 and further comprising retaining means on said common edge of said frame and inner panel, said retaining means facilitating the connection of cargo to said organizer.

7. The cargo organizer as defined in claim 6 wherein said retaining means comprises tabs extending from said inner panel for connecting the cargo to said organizer.

8. The cargo organizer as defined in claim 3 wherein said dividing means includes at least one divider cord extending between opposite edges of said peripheral frame.

9. The cargo organizer as defined in claim 2 wherein said dividing means includes at least one divider panel hingedly connected to said planar body, said at least one divider panel foldable away from said planar body and engageable with the load floor to maintain said planar body in a substantially vertical position forming said cargo organizer.

10. A cargo organizer for a rear cargo compartment of a vehicle, said cargo compartment having a load floor, said vehicle cargo organizer comprising:

a substantially planar body adapted to be hingedly mounted to the load floor of the cargo compartment, said body selectively foldable to form a compartmentalized organizer, said organizer stored substantially flush with the load floor forming a flat load surface within the cargo compartment and selectively erectable to form said compartmentalized organizer;

said planar body including a peripheral frame hingedly attached to the load floor along one edge of said frame and an inner panel hingedly connected within said frame along one common edge therebetween, said inner panel selectively foldable into two sections upon erection of said organizer, said inner panel including an upper wall and a base wall hingedly connected along a fold line parallel to said common hinged edge, said inner panel folding along said hingeed line upon erection of said organizer such that said upper wall forms a substantially vertical support and said base wall remains flush with said load floor, said inner panel forming a support leg upon erection of said frame such that said frame extends at an angle from said hinged edge of said inner panel spaced above the load floor downwardly to the load floor.

11. The cargo organizer as defined in claim 10 wherein said inner panel is connected to said frame by a living hinge extending along said common edge thereby maintaining said inner panel integral with said frame.

12. The cargo organizer as defined in claim 10 and further comprising retaining means facilitating connection of cargo to said organizer, said retaining means comprising tabs extending upwardly from said inner panel to which cargo can selectively be connected.

13. The cargo organizer as defined in claim 10 and further comprising at least one divider cord extending between opposite edges of said peripheral frame to divide said organizer into a plurality of separated compartments, said divider cords selectively engageable to vary the size and number of compartments in said organizer.

14. A cargo organizer for a rear cargo compartment of a vehicle, said cargo compartment having a load floor, said vehicle cargo organizer comprising:

a substantially planar body adapted to be hingedly mounted to the load floor of the cargo compartment, said body selectively foldable to form a compartmentalized organizer, said organizer stored substantially flush with the load floor and substantially covering the load floor within the cargo compartment;

said planar body including a peripheral frame hingedly attached to the load floor and an inner panel hingedly connected to said frame along one common edge, said inner panel disposed within said frame upon storing said organizer flat within said storage compartment and including an upper wall portion and a base wall portion hingedly connected along a fold line, said inner panel folding along said hinged line upon erection of said organizer such that said panel forms a support for said frame extending at an angle from said hinged edge of said inner panel spaced above the load floor downwardly to the load floor.

15. The cargo organizer as defined in claim 14 and further comprising means for dividing said organizer into a plurality of separated compartments, said dividing means selectively engageable to vary the size and number of compartments in said organizer.

16. The cargo organizer as defined in claim 14 and further comprising retaining means on said common edge of said frame and inner panel, said retaining means facilitating the connection of cargo to said organizer.

17. The cargo organizer as defined in claim 16 wherein said retaining means comprises tabs extending from said inner panel for connecting the cargo to said organizer.

18. The cargo organizer as defined in claim 14 wherein said inner panel folds along said hinged line upon erection of said organizer such that said upper wall forms a substantially vertical support and said base wall remains flush with said load floor.

* * * * *